(12) United States Patent
Lee et al.

(10) Patent No.: US 10,557,627 B2
(45) Date of Patent: Feb. 11, 2020

(54) COOLING MEDIUM GENERATING APPARATUS USING STEAM OF NUCLEAR POWER PLANT AND COOLING METHOD THEREFOR

(71) Applicants: Chang Kun Lee, Seoul (KR); Hiehil Lee, Seoul (KR)

(72) Inventors: Chang Kun Lee, Seoul (KR); Hiehil Lee, Seoul (KR)

( * ) Notice: Subject to any disclaimer, the term of this patent is extended or adjusted under 35 U.S.C. 154(b) by 130 days.

(21) Appl. No.: 15/746,147

(22) PCT Filed: May 9, 2016

(86) PCT No.: PCT/KR2016/004787
§ 371 (c)(1),
(2) Date: Jan. 19, 2018

(87) PCT Pub. No.: WO2017/018643
PCT Pub. Date: Feb. 2, 2017

(65) Prior Publication Data
US 2018/0224116 A1 Aug. 9, 2018

(30) Foreign Application Priority Data
Jul. 24, 2015 (KR) ........................ 10-2015-0104992

(51) Int. Cl.
*F22B 1/02* (2006.01)
*F01K 9/00* (2006.01)
*F22B 35/00* (2006.01)

(52) U.S. Cl.
CPC .............. *F22B 1/023* (2013.01); *F01K 9/003* (2013.01); *F22B 35/004* (2013.01)

(58) Field of Classification Search
CPC ........ F25B 1/023; F01K 9/003; F22B 35/004; C02F 2103/08; C02F 1/16; G21D 3/08;
(Continued)

(56) References Cited

U.S. PATENT DOCUMENTS

| 2010/0266085 A1* | 10/2010 | Ahlfeld | ................ | G21C 1/026 |
| | | | | 376/210 |
| 2011/0075787 A1* | 3/2011 | McWhirter | ........... | F28D 1/0213 |
| | | | | 376/405 |

(Continued)

FOREIGN PATENT DOCUMENTS

| JP | 05-231302 | 9/1993 |
| JP | 2001-004791 | 1/2001 |

(Continued)

*Primary Examiner* — Emmanuel E Duke
(74) *Attorney, Agent, or Firm* — Allen, Dyer, Doppelt + Gilchrist, P.A.

(57) ABSTRACT

The present invention relates to an apparatus for efficiently and economically generating a cooling medium by using high-temperature and high-pressure steam generated in a nuclear power plant, and cooling method therefor. According to one embodiment of the present invention, the cooling medium generating apparatus provided in a containment vessel of a nuclear power generation facility so as to generate the cooling medium can comprise: a nuclear reactor for heating a coolant by using heat included in the heated coolant; a cooling module for generating the cooling medium by using the steam generated in the steam generator; and a cooling medium supplying pipe of which the end portion is connected to the outside of the containment vessel so as to supply the cooling medium, having been generated in the cooling module, to the outside of the containment vessel.

15 Claims, 4 Drawing Sheets

(58) Field of Classification Search
CPC .......... G21D 9/00; G21D 1/00; G21C 13/022;
G21C 15/18; Y02E 30/40
See application file for complete search history.

(56) References Cited

U.S. PATENT DOCUMENTS

| | | | | |
|---|---|---|---|---|
| 2013/0140005 A1* | 6/2013 | Tietsch | ................... | G21C 9/012 |
| | | | | 165/104.21 |
| 2015/0218970 A1* | 8/2015 | Ahn | ................... | F01K 15/00 |
| | | | | 290/40 B |
| 2016/0372220 A1* | 12/2016 | Bodi | ................... | G21F 9/30 |

FOREIGN PATENT DOCUMENTS

| | | |
|---|---|---|
| JP | 2001-013282 | 1/2001 |
| KR | 10-2011-0102721 | 9/2011 |
| KR | 10-2013-0000914 | 1/2013 |

* cited by examiner

COOLING MEDIUM GENERATING APPARATUS USING STEAM OF NUCLEAR POWER PLANT AND COOLING METHOD THEREFOR

FIELD OF THE INVENTION

The present invention relates to an apparatus for efficiently and economically generating a cooling medium by using high-temperature and high-pressure steam generated in a nuclear power plant and cooling method therefor.

BACKGROUND OF THE RELATED ART

Nuclear power generation is a process by means of nuclear fission in a nuclear reactor, i.e. a process in which nuclear fission takes place by causing a uranium nucleus to collide with a neutron, and then the heat released at the time of nuclear fission is transformed into electricity.

Although nuclear power stations require high initial costs for construction, compared to other electricity generating facilities, fuel costs incurred by nuclear power plants are much lower than those of other facilities. Also, in consideration of their operational life span, nuclear power plants are advantageous not only in that they require a low cost of generating electricity but also in that they are environmentally friendly thanks to their low greenhouse gas emissions. However, radioactivity produced in the process of electricity generation has a detrimental effect on humans and the environment of the earth. The issue of disposing of high-level radioactive waste remains controversial. Also, there is the risk of nuclear accidents. These are the disadvantages of nuclear power stations.

FIG. 1 schematically shows cooling or freezing equipment systems by means of traditional processes of nuclear power generation. By reference to FIG. 1, traditional nuclear power generation systems comprise a containment vessel 10, a nuclear reactor 12, a steam generator 14, a turbine 16 and a generator 18.

The heat generated by nuclear fission in a nuclear reactor 12 is delivered to a steam generator 14, and the steam generator 14 makes high-temperature and high-pressure steam by using the delivered heat. The steam generated in the steam generator 14 is supplied to a turbine 16, and a generator 18 connected to the turbine 16 is used to generate electricity.

The electricity generated in the generator 18 is supplied to the cooling equipment 22 of a building 2, located nearby or remotely, through a transmission line 20. The cooling equipment 22 generates cooling air by using the electricity supplied by the generator 18, and the cooling air is used to cool the building 2.

However, such traditional cooling equipment systems have low energy efficiency. This means they have the problems that energy efficiency dramatically declines during the process in which nuclear energy is transformed into thermal energy, mechanical energy or electric energy and that transmission loss, heat generation or noise generation takes place during electric power transmission. This means electricity supplies alone are not sufficient to cool and freeze large-scale facilities.

Accordingly, there is a growing demand for facilities capable of cooling and freezing in a more efficient way.

DETAILED DESCRIPTION OF THE INVENTION

Technical Problems

The present invention is devised to solve the problems mentioned heretofore, and the purpose of the present invention is to provide to users an apparatus for generating a cooling medium efficiently and economically by using high-temperature and high-pressure steam generated in a nuclear power plant and cooling method therefor.

Specifically, the purpose of the present invention is to provide to users a cooling medium-generating apparatus where a cooled refrigerant is generated by driving a piston by means of the high-temperature and high-pressure steam generated in a steam generator and by compressing and expanding a cooling medium depending on the driving of the piston, and therefore, a cooling medium can be obtained in an efficient way.

Further, the purpose of the present invention is to provide a cooling medium-generating apparatus, which can perform multiple functions and improve efficiently and economically by adding cooling functions to SMART nuclear reactors.

Meanwhile, technical problems to be solved by the present invention are not limited to the above-mentioned ones and other problems, not mentioned heretofore, can be clearly understood from the following descriptions by one skilled in the art to which the present invention pertains.

Solutions to the Problems

According to a cooling medium-generating apparatus installed in the containment vessel of a nuclear power-generating facility, to achieve the above described purpose, the cooling medium-generating apparatus in relation to an embodiment of the present invention may comprise a nuclear reactor for heating coolants by means of nuclear fission; a steam generator, receiving the coolants heated in the nuclear reactor, for generating steam by using the heat contained in the heated coolants; a cooling module for generating a cooling medium by using the steam having been generated in the steam generator; and a cooling medium-supplying pipe, having its end connected with the outside of the containment vessel, for supplying the cooling medium, having been generated in the cooling module, to the outside of the containment vessel.

Additionally, the cooling medium-generating apparatus further comprises a controller for controlling the operation of the cooling module, wherein the cooling module further comprises a first steam-supplying pipe, connected with the steam generator, for conducting the steam, having been generated in the steam generator, into the cooling module; a cylinder for receiving the steam; and a piston, reciprocating in the cylinder depending on the pressure of the steam supplied to the cylinder, for compressing and expanding a refrigerant depending of the reciprocating, and wherein the refrigerant may be cooled at or below a certain temperature in response to the compressing or expanding of the refrigerant.

Additionally, the cooling module may further comprise a first refrigerant-conducting pipe, connected with the cylinder, for conducting the cooled refrigerant into the cooling module; and a heat-exchanging chamber, receiving the cooled refrigerant, for supplying the cooling medium to the cooling medium-supplying pipe.

Additionally, the cooling module further comprises a first switch for controlling the opening and closing of the first refrigerant-conducting pipe, wherein the first switch may control the amount of the refrigerant, having been cooled in the cylinder, to be conducted into the first refrigerant-conducting pipe depending on the control by the controller.

Additionally, the cooling module may further comprise a medium-conducting pipe, having its end connected to the outside of the containment vessel, for conducting a certain medium into the heat-exchanging chamber.

Additionally, the cooling module may further comprise a refrigerant-storing tank, connected with the first refrigerant-conducting pipe, for storing the cooled refrigerant; and a second refrigerant-conducting pipe, installed between the refrigerant-storing tank and the heat-exchanging chamber, for supplying part of the cooled refrigerant, stored in the refrigerant-storing tank, to the heat-exchanging chamber depending on the control by the controller.

Additionally, the cooling module may further comprise a second switch for controlling the opening and closing of the second refrigerant-conducting pipe, wherein the second switch may control the amount of the cooled refrigerant, stored in the refrigerant-storing tank, to be supplied to the heat-exchanging chamber.

Further, part of the second refrigerant-conducting pipe is installed in the heat-exchanging chamber to exchange heat between the cooled refrigerant, supplied to the heat-exchanging chamber, and the medium, conducted into the heat-exchanging chamber.

Additionally, the cooling module may further comprise a refrigerant-discharging pipe, installed between the refrigerant-storing tank and the heat-exchanging chamber, for supplying the refrigerant, having been used for heat exchange in the heat-exchanging chamber, to the refrigerant-storing tank.

Further, part of the cooled refrigerant, stored in the refrigerant-storing tank, is supplied to the cylinder and then compressed and expanded, and the refrigerant is cooled at or below a certain temperature in response to the compressing or expanding of the refrigerant.

Additionally, the cooling module may further comprise a subsidiary compressor for assisting with the compressing and expanding of the refrigerant depending on control by the controller, if the refrigerant is not cooled at or below a certain temperature depending the reciprocating of the piston.

Additionally, the cooling module may further comprise a steam-holding tank, connected to the other end of the first steam-supplying pipe, for storing the steam having been received from the first steam-supplying pipe; and a second steam-supplying pipe, installed between the steam-holding tank and the cylinder, for supplying part of the cooled steam, stored in the steam-holding tank, to the cylinder.

Additionally, the cooling module may further comprise a first pipe for delivering the coolants, having been heated in the nuclear reactor, to the steam generator; a second pipe for delivering the coolants, having been used for steam generation in the steam generator, to the nuclear reactor; and a steam-discharging pipe, having its one end connected to the second pipe, for discharging the steam, having been used for the reciprocating of the piston, into the second pipe.

Meanwhile, according to the method of generating a cooling medium by means of the cooling module installed in the containment vessel of a nuclear power station, to achieve the above described purposes, the method of generating a cooling medium in relation to an embodiment of the present invention comprises: a first step of receiving the steam, having been generated in a steam generator, by a cooling module; a second step of generating a cooling medium by the cooling module using the steam; and a third step of supplying the cooling medium, having been generated in the cooling module, to the outside of a containment vessel through a cooling medium-supplying pipe having its end connected to the outside of the containment vessel, wherein the steam generator receives the heated coolants from a nuclear reactor heating coolants by means of nuclear fission and may generate steam by using the heat contained in the heated coolants.

Further, the second step comprises the steps of receiving the steam by a cylinder; reciprocating by a piston in the cylinder depending on the pressure of the steam supplied to the cylinder; compressing and expanding a refrigerant depending on the reciprocating of the piston; and cooling the refrigerant at or below a certain temperature in response to the compressing or expanding of the refrigerant, wherein the first steam-supplying pipe has its one end connected to the steam generator to conduct the steam, having been generated in the steam generator, into the first steam-supplying pipe.

Effects of the Invention

The present invention is directed to providing to users an apparatus for generating a cooling medium efficiently and economically by using high-temperature and high-pressure steam having been generated from a nuclear power station and cooling method therefor.

Specifically, the present invention is directed to providing to users an apparatus for generating a cooling medium efficiently, wherein a piston is driven by using high-temperature and high-pressure steam having been generated from a steam generator, a refrigerant is compressed and expanded depending on the driving of the piston, and then, a cooling medium can be obtained in an efficient way.

Further, the present invention is directed to providing a cooling medium-generating apparatus, which can perform multiple functions and improve efficiently and economically by adding cooling functions to SMART nuclear reactors.

Meanwhile, desirable effects achieved by the present invention are not limited to the above-mentioned ones, and other effects, not mentioned herein, can be clearly understood from the following descriptions by one of ordinary skill in the art to which the present invention pertains.

BRIEF DESCRIPTION OF THE DRAWINGS

Since the following drawings attached in the present application illustrate a preferred embodiment of the present invention and are helpful for better understanding of technical ideas of the present invention along with the detailed description of the present invention, the present invention shall not be translated as being limited only to the descriptions of the drawings.

PREFERRED EMBODIMENT OF THE INVENTION

Preferred embodiments of the present invention are described hereafter by reference to the drawings. Further, an embodiment described hereafter does not unfairly limit the scope of the present invention described in the claims and the entire features in the description of the embodiments may not be necessary as a means to solve problems.

Further, same drawing symbols are given to elements performing and operating in a similar way throughout the specification. Throughout the specification, when one element is "connected" to another, it means not only that they are directly connected but also that they are indirectly connected with a third interposed between them. Further, unless explicitly described to the contrary, the term "comprise" shall be understood to imply the inclusion of other elements but not the exclusion of other elements.

<An Apparatus for Generating a Cooling Medium>

In the following description, the features of the apparatus for generating a cooling medium according to the present invention are described by reference to the drawings.

Figure 1:
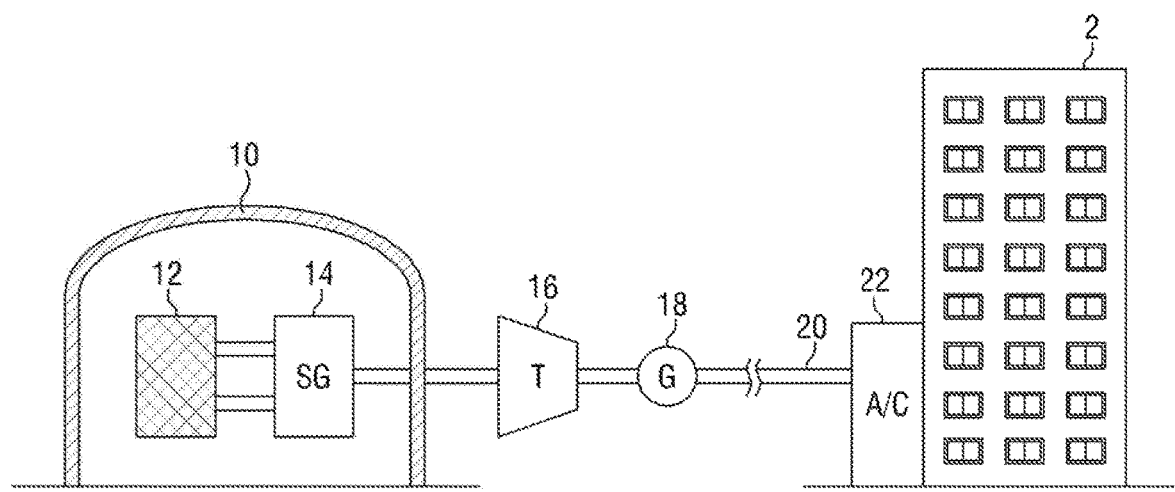
FIG. 1 schematically shows cooling or freezing equipment systems by means of traditional processes of nuclear power generation.
Figure 2:
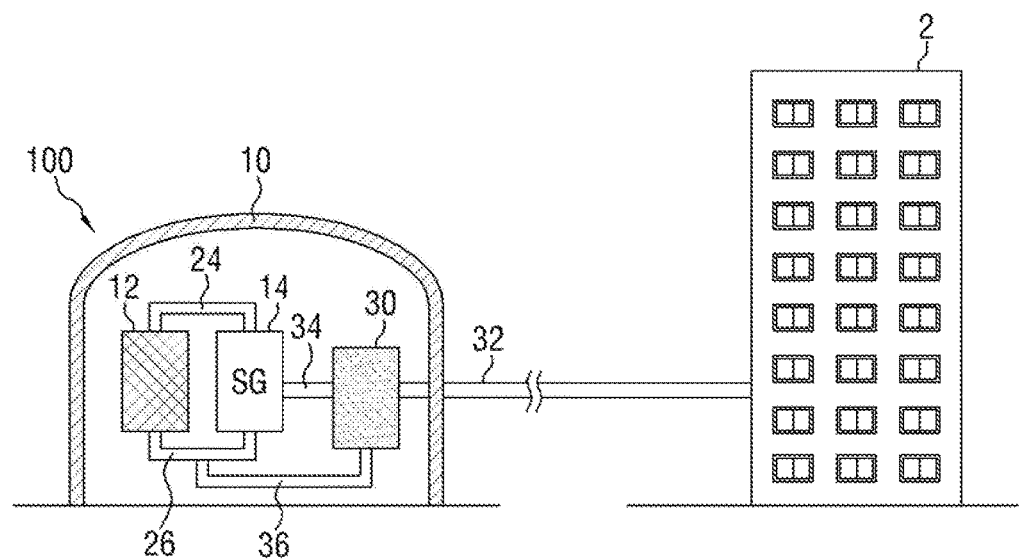
FIG. 2 shows an embodiment of the apparatus for generating a cooling medium embodiable according to the present invention.

FIG. 2 shows an embodiment of the apparatus for generating a cooling medium embodiable according to the present invention.

By reference to FIG. 2, the apparatus for generating a cooling medium 100 according to the present invention comprises a nuclear reactor 12, a steam generator 14 and a cooling module 30 inside a containment vessel 10. The interior of the containment vessel 10 is closed to prevent leakage of dangerous substances.

But an apparatus for generating a cooling medium 100, having more elements or having less elements than in FIG. 2, may be embodied because the elements illustrated in FIG. 2 are not necessary ones.

The nuclear reactor 12 heats coolants by means of nuclear fission. The nuclear reactor 12 consists of a nuclear core, a moderator, a control rod and coolants. A large amount of heat is generated through a nuclear fission chain reaction in a nuclear core, and a moderator reduces the speed of neutrons emitted during nuclear fission. A control rod lowers the speed of a nuclear fission chain reaction in a nuclear core, and coolants prevent a nuclear core from being overheated while delivering the heat having been generated in a nuclear core.

The high-temperature and high-pressure coolants having been heated in a nuclear reactor are delivered to a steam generator 14 through a first pipe 24. The steam generator 14 generates steam by using the heat contained in the high-temperature and high-pressure coolants. The coolants, having been used for steam generation, get into a high-temperature-and-high-pressure state and then they are delivered to the nuclear reactor 12 through a second pipe 26.

The cooling module 30 is installed inside the containment vessel 10 or installed to contact the containment vessel 10.

The cooling module 30 generates a cooled medium by using the steam having been generated by the steam generator 14. The cooled medium, having been generated by the cooling module 30, is delivered to the outside of the containment vessel 10 through a cooling medium-supplying pipe 32. The building 2, located outside the containment vessel 10, performs cooling and freezing functions by receiving the cooled medium through the cooling-medium supplying pipe 32.

Figure 3:
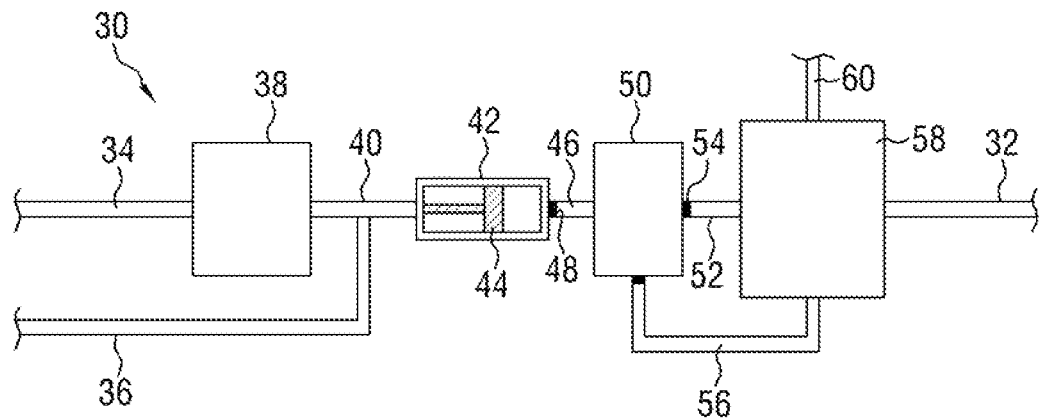
FIG. 3 shows an embodiment of a cooling module applicable to the apparatus for generating a cooling medium according to the present invention.

The specific configuration of the cooling module 30 is illustrated in FIG. 3. FIG. 3 shows an example of a cooling module applicable to the apparatus for generating a cooling medium according to the present invention.

One end of a first steam-supplying pipe 34 is connected to the steam generator 14, and the other end of the first steam-supplying pipe is connected to a steam-holding tank 38.

The steam having been generated in the steam generator 14 is supplied into the cooling module 34 through the first steam-supplying pipe 34. The steam having been supplied through the first steam-supplying pipe 34 is temporarily held in the steam-holding tank 38.

A second steam-supplying pipe 40 connects the steam-holding tank 38 with a cylinder 42. Part of the cooled steam, held in the steam-holding tank 38, is supplied to the cylinder 42 depending on control by a controller.

One end of a steam-discharging pipe 36 is connected to the second pipe 26. The steam having been used for the reciprocating of a piston 44 is discharged into the second pipe 26 through the steam discharging pipe 36.

The cylinder 42 receives steam from the second steam-supplying pipe 40. The piston 44 reciprocates inside the cylinder 42 depending on the pressure of the steam supplied to the cylinder 42. Depending on the reciprocating of the piston 44, a refrigerant is compressed or expanded and is cooled at or below a certain temperature in response to the compressing or expanding of the refrigerant.

The cooling module 30 may further comprise a subsidiary compressor (not shown), capable of compressing or expanding a refrigerant. A subsidiary compressor driven by electricity may be used in case the pressure of steam is not enough to compress a refrigerant or in case it takes a long time to compress a refrigerant. The refrigerant, having been cooled by a subsidiary compressor, is supplied to a refrigerant-storing tank 50.

The subsidiary compressor may assist with the compressing and expanding of a refrigerant, in case a refrigerant is not cooled at or below a certain temperature depending on the reciprocating of the piston 44.

One end of a first refrigerant-conducting pipe 46 is connected to the cylinder 42, and the other end of the first refrigerant-conducting pipe 46 is connected to the refrigerant-storing tank 50. The refrigerant, having been cooled depending on the reciprocating of the piston 44, is temporarily held in the refrigerant storing tank 50 through the first refrigerant-conducting pipe 46.

A first switch 48 is installed in the first refrigerant-conducting pipe 46 and the first switch 48 controls the opening and closing of the first refrigerant-conducting pipe 46 depending on control by the controller. The first switch 48 controls the amount of the refrigerant, having been cooled in the cylinder 42, to be conducted into the first refrigerant-conducting pipe 46.

A second refrigerant-conducting pipe 52 connects the refrigerant storing tank 50 with a heat-exchanging chamber 58. Part of the refrigerant, stored in the refrigerant-storing tank 50, is supplied to the heat-exchanging chamber 58 depending on control by the controller.

A second switch 54 is installed in the second refrigerant-conducting pipe 52 and the second switch 54 controls the opening and closing of the second refrigerant-conducting pipe 52 depending on control by the controller. The second switch 54 controls the amount of the cooled refrigerant, stored in the refrigerant-storing tank 50, to be supplied to the heat-exchanging chamber 58.

The heat-exchanging chamber 58 receives a cooled refrigerant through the second refrigerant-conducting pipe 52. Further, the heat-exchanging chamber 58 receives a medium outside the containment vessel 10 through a medium-conducting pipe 60 having its one end connected to the outside of the containment vessel 10. Water or air may be used as the medium.

Part of the second refrigerant-conducting pipe 52 is placed in the heat-exchanging chamber 58, and heat exchange takes place between the cooled refrigerant, having been supplied to the heat-exchanging chamber 58, and the medium, having been conducted into the heat-exchanging chamber 58. By this means, a medium is cooled and the cooled medium is supplied to the outside of the containment vessel 10 through the cooling medium-supplying pipe 32.

A refrigerant-discharging pipe 56 is further installed between the refrigerant-storing tank 50 and the heat-exchanging chamber 58. The refrigerant having been used for heat exchange in the heat-exchanging chamber 58 is supplied to the refrigerant-storing tank 50 through the refrigerant-discharging pipe 56.

Part of the cooled refrigerant, stored in the refrigerant-storing tank 50, is supplied to the cylinder 40 again and compressed and expanded. As a result, the refrigerant is cooled at or below a certain temperature.

<A Method for Generating a Cooling Medium>

Figure 4:
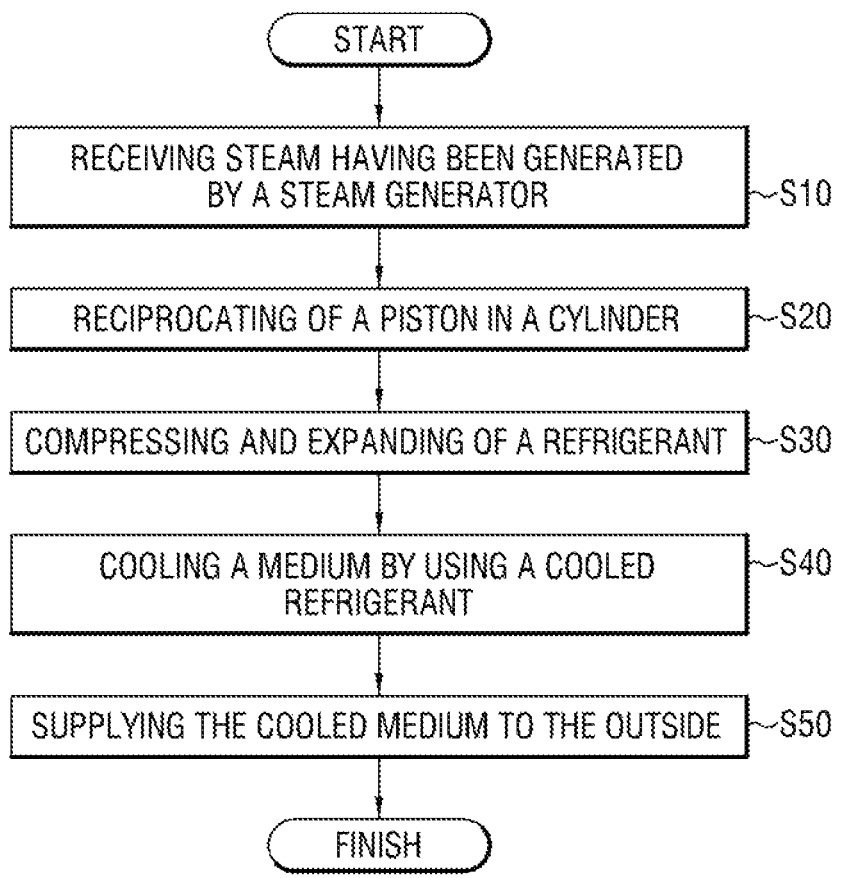
FIG. 4 is a flow chart showing the method for generating a cooling medium according to the present invention.

The method for generating a cooling medium according to the present invention is described hereafter in detail by reference to FIG. 4. FIG. 4 is a flow chart showing an example of the method for generating a cooling medium according to the present invention.

By reference to FIG. 4, the cooling module 30 first receives the steam having been generated by the steam generator 14 (S10).

Then, the steam is supplied to the cylinder 42, and the piston 44 reciprocates in the cylinder 42 depending on the pressure of the steam having been supplied to the cylinder (S20).

Then, a refrigerant is compressed or expanded depending on the reciprocating of the piston 44 (S30). The refrigerant is cooled at or below a certain temperature in response to the compressing or expanding of the refrigerant.

Then, the cooled refrigerant is supplied into the heat-exchanging chamber 58 through a second refrigerant-conducting pipe 52, a medium outside the containment vessel 10 is supplied into the heat-exchanging chamber 58 through a medium-conducting pipe 60. The medium is cooled by means of heat exchange between the cooled refrigerant and the medium (S40).

And then, the medium, having been cooled in the cooling module 30, is supplied outside the containment vessel 10 through a cooling medium-supplying pipe 32 (S50).

<Modified Examples>

Figure 5:
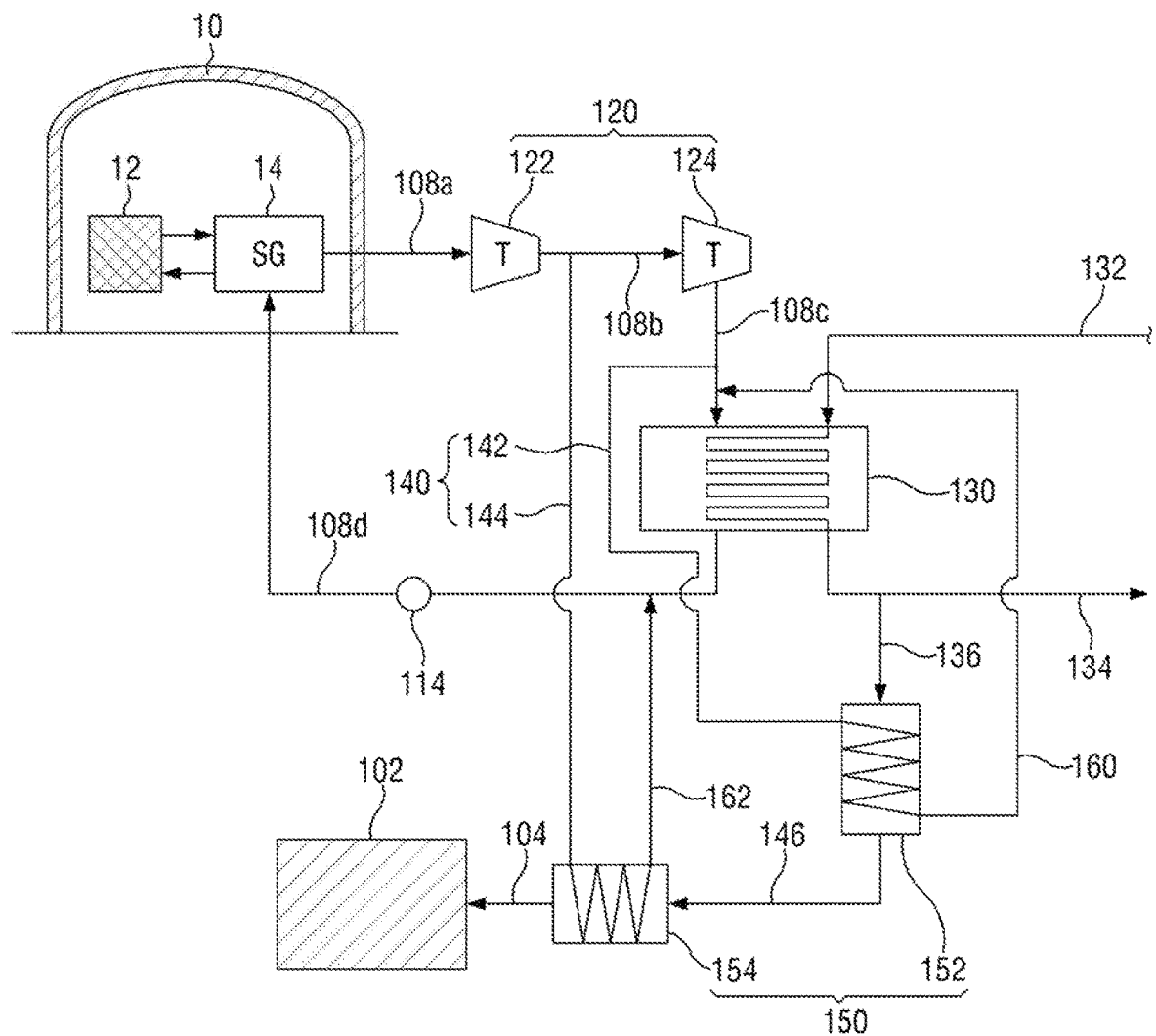
FIG. 5 shows a modified example applicable to the apparatus for generating a cooling medium according to the present invention.

Modified examples of the apparatus for generating a cooling medium according to the present invention are described hereafter in detail by reference to FIG. 5. FIG. 5 shows a modified example applicable to the apparatus for generating a cooling medium according to the present invention.

By reference to FIG. 5, a turbine 120 receives steam having been generated by the steam generator 14 and it is connected with an electricity generator to generate electricity by using the steam. The turbine 120 consists of a high-pressure turbine 122 and a low-pressure turbine 124.

In relation to this, there are two kinds of heat exchangers 150 consisting of a first heat exchanger 152 and a second heat exchanger 154. The first heat exchanger 152 and the second heat exchanger 154 are connected to each other by means of a pipe 146.

The high-pressure turbine 122 is connected with the steam generator 14 by means of a first pipeline (108a) and receives the steam having been generated in the steam generator 14. The low-pressure turbine 124 is connected with the high-pressure turbine 122 by means of a second pipeline (108b) and receives the steam having been exhausted from the high-pressure turbine 122.

A second steam-supplying pipe 144 is branched off from the second pipeline (108a). Second steam, part of the steam having been exhausted from the high-pressure turbine 122 is supplied to a second heat exchanger 154 through a second steam-supplying pipe 144.

A second returning pipe 162 is connected to the second heat exchanger 154. The second steam having been used for heat exchange in the second heat exchanger 154 is supplied to a fourth pipeline (108d) through the second returning pile 162. But the configuration of the second returning pipe 162, as shown in FIG. 5, is not limited to the one where the second returning pipe 162 is connected to the fourth pipeline (108d). That is, the configuration in which the second steam is supplied to circulate a steam cycle is enough.

Further, a first steam-supplying pipe 412 is branched off from the third pipeline (108c). First steam, part of the steam having been exhausted from the low-pressure turbine 124 is supplied to a first heat exchanger 152 through a first steam-supplying pipe 142.

A first returning pipe 160 is connected to the first heat exchanger 152. The first steam having been used for heat exchange in the first heat exchanger 152 is supplied to a third pipeline (108c) through the first returning pile 160. But the configuration of the first returning pipe 160, as shown in FIG. 5, is not limited to the one where the first returning pipe 160 is connected to the third pipeline (108c). That is, the configuration in which the first steam is supplied to circulate a steam cycle is enough.

Meanwhile, a condenser 130 is connected with the low-pressure turbine 124 by means of the third pipeline (108c) and receives the steam, having been exhausted by the low-pressure turbine 124, through the third pipeline (108c).

The condenser 130 has a conducting pipe 132 connected to the outside and a discharging pipe 134.

Figure 6A:
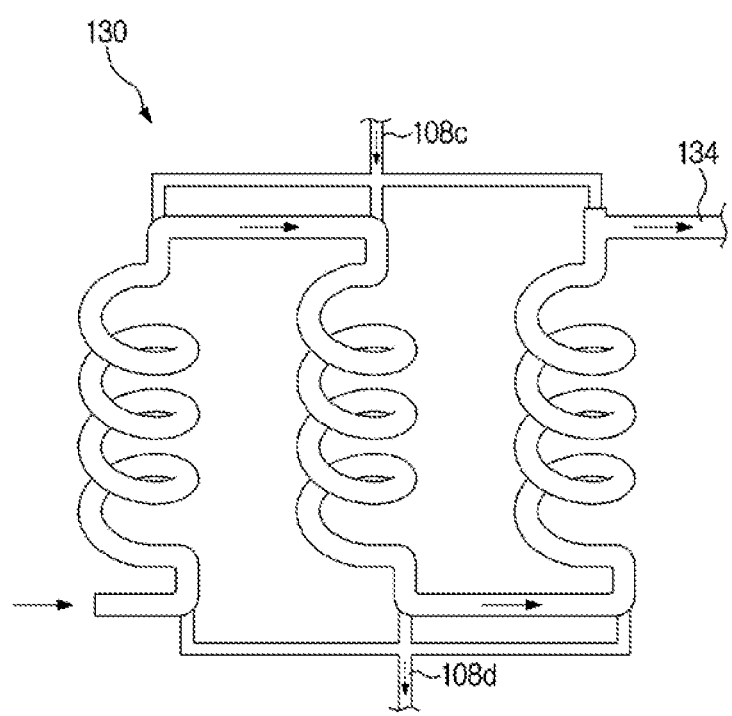
FIG. 6A shows an embodiment of a plurality of pipe modules installed inside the condenser of FIG. 5.
Figure 6B:
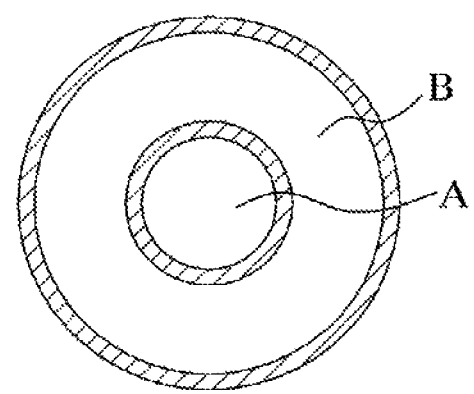
FIG. 6B is a schematic cross-sectional view of a pipe as shown in FIG. 6A.

By reference to the interior structure of the condenser 130 illustrated in FIGS. 6A and 6B, a plurality of pipe modules is installed inside the condenser 130. FIG. 6A shows an embodiment in which three pipe modules are installed. The pipe modules comprise an interior pipe (A) installed inside and an exterior pipe (B) surrounding the outside of the interior pipe. Steam flows through the interior pipe and sea water flows through the exterior pipe.

In the third pipeline (108c), steam flows into the interior pipe of the first pipe module and the steam is discharged from the fourth pipeline (108d) through the interior pipes of the second pipe module and the third pipe module. Sea water flows into the exterior pipe of the first pipe module and the sea water is discharged from the discharging pipe (134) through the exterior pipes of the second pipe module and the third pipe module.

During the process of passing through the three pipe modules, the temperature of sea water further rises and efficiency in sea water desalination improves.

The condenser 130 and the steam generator 14 are connected by means of the fourth pipeline (108d). Condensed water, having been generated in the condenser 130, returns to the steam generator 14 through the fourth pipeline (108d).

A sea water-supplying pipe 136 is branched off from the discharging pipe 134. The sea water-supplying pipe 136 supplies first sea water, part of the sea water having been discharged from the condenser 130, to the first heat exchanger 152.

The temperature of the first sea water rises while passing through the first heat exchanger 152 and the second heat exchanger 154. The first sea water is supplied to a fresh water-generating unit 102 through a connecting pipe 104, and sea water desalination of the first sea water is performed in the fresh water-generating unit 102.

Meanwhile, a method for sea water desalination applicable to the present invention is described.

Heat-exchanging steam, part of the steam having been exhausted from the turbine 120, is supplied to a heat-exchanger 150. As stated above, the turbine 120 comprises a high-pressure turbine 122 and a low-pressure turbine 124.

The high-pressure turbine 122 receives the steam, having been generated by the steam generator 14, through a first pipeline (108a) and generates electricity by using the steam. The pressure of the steam, passing through the high-pressure turbine 122, drops, and the steam is changed into saturated one with high-temperature. The moisture in the saturated steam with high-temperature may be removed by a heater (not shown), installed in the second pipeline (108b) and may be heated again.

Second steam, part of the steam having been exhausted from the high-pressure turbine 122, is supplied to a second heat exchanger 154 through a second steam-supplying pipe 144 branched off from the second pipeline (108b). Preferably, 10% to 40% of the steam, having been exhausted from the high-pressure turbine 122, is supplied to the second heat exchanger 154.

Meanwhile, the low-pressure turbine 124 receives steam from the high-pressure turbine 122 through the second pipeline (108b) and generates electricity by using the steam.

First steam, part of the steam having been exhausted from the low-pressure turbine 124 is supplied to a first heat exchanger 152 through a first steam-supplying pipe 142 branched off from a third pipeline (108c). Preferably, 10% to 40% of the steam, having been exhausted from the low-pressure turbine 124, is supplied to the first heat exchanger 152.

In this way, the first and second steam, part of the steam having been exhausted from the turbine 120 is supplied respectively to the first 152 and the second 154 heat exchangers through the first 142 and second 144 steam-supplying pipes.

Then, the first heat exchanger 152 performs first pre-heating for the first sea water by using the heat contained in the first steam. The temperature of the first sea water rises to a first temperature range by means of the first pre-heating. For instance, the temperature of the first sea water flowing through a sea water-supplying pipe 136 is about 35° C. while the temperature of the first sea water having experienced the first pre-heating rises to about 60° C., which means the temperature ranges from 50° C. to 70° C.

Meanwhile, the first steam having experienced the first pre-heating in the first heat exchanger 152 returns to circulate a steam cycle through a first returning pipe 160.

Then, the second heat exchanger 154 performs the second pre-heating for the first sea water by using the heat contained in the second steam. The temperature of the first sea water rises to a second temperature range which is higher than the first temperature range. For instance, the temperature of the first sea water having experienced the second pre-heating rises to about 100° C., which means the temperature ranges from 90° C. to 110° C.

Meanwhile, the second steam having experienced the second pre-heating in the second heat exchanger 154 returns to circulate a steam cycle through a second returning pipe 162.

Then, the first steam having experienced such a temperature rise is supplied to a fresh water-generating unit 102, and the fresh water generating unit 102 performs desalination for the first sea water.

Meanwhile, the present invention can be embodied as a computer-readable code in a computer-readable recording medium. The computer-readable recording medium includes all kinds of recording medium for storing data which can be read by a computer system. Examples of the computer-readable recording medium include ROMs, RAMS, CD-ROMs, magnetic tapes, floppy disks, optical data storing devices, and so forth. Also, included are things that are embodied in types of carrier waves The computer-readable recording medium is distributed in a computer system connected by a network. The computer readable codes are stored and performed in the way that the computer-readable recording medium is distributed. Further, functional programs, codes and code segments to embody the present invention may be easily inferred by programmers in the art to which the present invention pertains.

Further, the features and methods described above are not limitedly applied to the devices and methods described heretofore, and the embodiments described above may be configured by wholly or selectively combining the embodiments so that various changes can be made.

PARTS LIST FREE TEXT

2: Building
10: Containment vessel
12: Nuclear reactor
14: Steam generator
16: Turbine
18: Electricity generator
20: Transmission line
22: Cooling equipment
24: First pipe
26: Second pipe
30: Cooling module
32: Cooling medium-supplying pipe
34: First steam-supplying pipe
36: Steam-discharging pipe
38: Steam-holding tank
40: Second steam-supplying pipe
42: Cylinder
44: Piston
46: First refrigerant-conducting pipe
48: First switch
50: Refrigerant-storing tank
52: Second cooling medium-conducting pipe
54: Second switch
56: Refrigerant-discharging pipe
58: Heat-exchanging chamber
60: Medium-conducting pipe
100: Cooling system

The invention claimed is:

1. An apparatus, installed in a containment vessel of a nuclear power generation facility for generating a cooling medium comprising: a nuclear reactor for heating coolants by means of nuclear fission; a steam generator for receiving the coolants, having been heated in the nuclear reactor and for generating steam by using heat contained in the heated coolants; a cooling module for generating a cooling medium by using the steam having been generated in the steam generator; and a cooling medium-supplying pipe, having its end connected to the outside of the containment vessel, for supplying the cooling medium, having been generated in the cooling module, to the outside of the containment vessel.

2. The apparatus for generating a cooling medium according to claim 1 further comprising:
a controller for controlling operation of the cooling module,
wherein the cooling module further comprises:
a first steam-supplying pipe, connected to the steam generator, for conducting the steam having been generated by the steam generator;
a cylinder for receiving the steam; and
a piston, reciprocating in the cylinder depending on pressure of the steam having been supplied to the cylinder, for compressing or expanding a refrigerant depending on its reciprocating; and
wherein the refrigerant is cooled at or below a certain temperature in response to the compressing and expanding of the refrigerant.

3. The apparatus for generating a cooling medium according to claim 2,
wherein the cooling module further comprises:
a first refrigerant-conducting pipe, connected to the cylinder, for conducting the cooled refrigerant; and
a heat-exchanging chamber for receiving the cooled refrigerant and for supplying the cooling medium to the cooling medium-supplying pipe.

4. The apparatus for generating a cooling medium according to claim 3,
wherein the cooling module further comprises:
a first switch for opening and closing the first refrigerant-conducting pipe; and
wherein the first switch for controlling the amount of the refrigerant, having been cooled in the cylinder, is to be conducted into the first refrigerant-conducting pipe depending on control by the controller.

5. The apparatus for generating a cooling medium according to claim 3,
wherein the cooling module further comprises:
a medium-conducting pipe, having its end connected to the outside of the containment vessel, for conducting a certain medium into the heat-exchanging chamber.

6. The apparatus for generating a cooling medium according to claim 5,
wherein the cooling module further comprises:
a refrigerant-storing tank, connected to the first refrigerant-conducting pipe, for storing the cooled refrigerant inside of it; and
a second refrigerant-conducting pipe, installed between the refrigerant-storing tank and the heat-exchanging chamber, for supplying part of the cooled refrigerant, stored in the refrigerant storing tank, to the heat-exchanging chamber depending on control by the controller.

7. The apparatus for generating a cooling medium according to claim 6,
wherein the cooling module further comprises:
a second switch for opening and closing the second refrigerant-conducting pipe; and
wherein the second switch for controlling the amount of the cooled refrigerant, stored in the refrigerant-storing tank, is to be supplied to the heat-exchanging chamber depending on control by the controller.

8. The apparatus for generating a cooling medium according to claim 6,
wherein part of the second refrigerant-conducting pipe is placed inside the heat-exchanging chamber for heat exchange between the cooled refrigerant, having been supplied to the heat-exchanging chamber, and the medium, having been conducted into the heat-exchanging chamber.

9. The apparatus for generating a cooling medium according to claim 8,
wherein the cooling module further comprises:
a refrigerant-discharging pipe, installed between the refrigerant-storing tank and the heat-exchanging chamber, for supplying the refrigerant, having been used for heat exchange in the heat-exchanging chamber, to the refrigerant-storing tank.

10. The apparatus for generating a cooling medium according to claim 9,
wherein part of the cooled refrigerant, stored in the refrigerant-storing tank, is supplied to the cylinder and compressed or expanded; and
wherein the refrigerant is cooled at or below a certain temperature in response to the compressing or expanding of the refrigerant.

11. The apparatus for generating a cooling medium according to claim 3,
wherein the cooling module further comprises:
a subsidiary compressor for assisting with the compressing or expanding of the refrigerant depending on control by the controller, in case the refrigerant is not cooled at or below a certain temperature depending on the reciprocating of the piston.

12. The apparatus for generating a cooling medium according to claim 2,
wherein the cooling module further comprises:
a steam-holding tank, connected to the other end of the first steam-supplying pipe, for storing the steam having been received from the first steam-supplying pipe; and
a second steam-supplying pipe for supplying part of the cooled steam, stored in the steam-holding tank, to the cylinder depending on control by the controller.

13. The apparatus for generating a cooling medium according to claim 12 further comprising:
a first pipe for delivering coolants, having been heated in the nuclear reactor, to the steam generator;
a second pipe for delivering the coolants, having been used for steam generation in the steam generator, to the nuclear reactor; and
wherein the cooling module further comprises:
a steam-discharging pipe, having its one end connected to the second pipe, for discharging the steam, having been used for the reciprocating of the piston, to the second pipe.

14. A method of an apparatus, installed in a containment vessel of a nuclear power generation facility for generating a cooling medium comprising:
a first step in which a cooling module receives steam having been generated by a steam generator;
a second step in which the cooling module generates a cooling medium by using the steam; and
a third step in which the cooling medium having been generated by the cooling module is supplied to the outside of the containment vessel through a cooling medium-supplying pipe having its end connected to the outside of the containment vessel; and wherein the steam generator receives heated coolants from a nuclear reactor using nuclear fission to heat coolants and generates steam by using heat contained in the heated coolants.

15. The method for generating a cooling medium, according to claim 14, wherein the second step further comprises:

a step in which a cylinder receives the steam;

a step in which a piston reciprocates in the cylinder depending on pressure of the steam having been supplied to the cylinder;

a step in which a refrigerant is compressed or expanded depending on the reciprocating of the piston; and a step in which the refrigerant is cooled at or below a certain temperature in response to the compressing or expanding of the refrigerant; and wherein the first steam-supplying pipe, having its one end connected to the steam generator, conducts steam having been generated in the steam generator.

\* \* \* \* \*